US006904456B2

(12) United States Patent
Cox

(10) Patent No.: US 6,904,456 B2
(45) Date of Patent: Jun. 7, 2005

(54) LOCK-FREE CACHE MANAGEMENT

(75) Inventor: Shaun D. Cox, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 09/789,280

(22) Filed: Feb. 20, 2001

(65) Prior Publication Data

US 2002/0116594 A1 Aug. 22, 2002

(51) Int. Cl.$^7$ .............................................. G06F 15/16
(52) U.S. Cl. ...................... 709/219; 709/203; 709/224; 709/226; 709/245; 711/208
(58) Field of Search .............................. 709/245, 203, 709/219, 200, 224, 226–229; 711/3, 118, 120, 200, 203, 205, 216, 208

(56) References Cited

U.S. PATENT DOCUMENTS

| | | | | | |
|---|---|---|---|---|---|
| 5,535,116 | A | * | 7/1996 | Gupta et al. | 700/5 |
| 5,651,123 | A | * | 7/1997 | Nakagawa et al. | 712/208 |
| 5,829,022 | A | * | 10/1998 | Watanabe et al. | 711/118 |
| 6,141,737 | A | * | 10/2000 | Krantz et al. | 711/171 |
| 6,298,428 | B1 | * | 10/2001 | Munroe et al. | 711/202 |
| 6,438,650 | B1 | * | 8/2002 | Quach et al. | 711/118 |
| 6,449,614 | B1 | * | 9/2002 | Marcotte | 707/8 |
| 6,563,823 | B1 | * | 5/2003 | Przygienda et al. | 370/392 |
| 6,581,106 | B1 | * | 6/2003 | Crescenzi et al. | 709/242 |

OTHER PUBLICATIONS

Hinden, R. et al.; "IP Version 6 Addressing Architecture," Internet Draft; (Mar. 2000), pp. 1–25; retrieved from http://ietf.org/internet–drafts/draft–ietf–ipngwg–scoping–01.txt, on Sep. 25, 2000.

Annotated Bibliography, "OS Support for High–Speed Networking"pp. 1–6; retrieved from http://www.cs.arizona.edu/xkernel/www/bibliography.html on Dec. 4, 1999.

"Imscan announces joint marketing agreement with NTIOM Systems," M2 Presswire pNA; (Jan. 12, 2000).

Hutchinson, Norman C., et al., "The x–Kernel: An Architecture for Implementing Network Protocols", pp. 1–26, Abstract.

Mosberger, David, "Map Library Design Notes", pp. 1–11, (Jan. 1996) Abstract.

Chu, Hsiao–Keng Jerry, "Zero–Copy TCP in Solaris", Sunsoft Inc., Abstract.

Mosberger, David, "Message Library Design Notes", pp. 1–8, (Jan. 1996).

Bailey, Mary L., et al., "The x–chip: An Experiment in Hardware Demultiplexing", *Department of Computer Science, The University of Arizona*.

Druschel, Peter, et al., "Network Subsystem Design: A Case for an Integrated Data Path", *Department of Computer Science, University of Arizona*, pp. 1–21, Abstract.

Abbott, Mark, B., et al., *"Increasing Network Throughput by Integrating Protocol Layers"* Department of Computer Science, The University of Arizona, pp. 1–28, Abstract.

(Continued)

*Primary Examiner*—Ario Etienne
*Assistant Examiner*—LaShonda Jacobs
(74) *Attorney, Agent, or Firm*—Leydig, Voit & Mayer Ltd.

(57) ABSTRACT

A data structure and method implemented in accordance with the invention enable reading a cache to get a type information corresponding to an address of interest more reliably than with volatile read operations and faster than scanning tables or walking along linked lists. Reliably reading the cache enabled by the invention does not require locks, although, the type information and the address together require more bits than those present in one machine word.

34 Claims, 11 Drawing Sheets

OTHER PUBLICATIONS

Mosberger, David, et al., "Analysis of Techniques to Improve Protocol Processing Latency", *Department of Computer Science, The University of Arizona*, to appear in *SIGCOMM 96*, pp. 1–12, Abstract.

Druschel, Peter, et al., "Experiences with a High–Speed Network Adaptor: A Software Perspective", *Department of Computer Science, University of Arizona, and Computer Networking Research Department, Bell Communications Research*, Abstract.

Wilson, Paul R., et al., "Dynamic Storage Allocation: A Survey and Critical Review", *Department of Computer Science, University of Arizona*, pp. 1–78, Abstract.

Mellor–Crummey, John M., et al., "Algorithms for Scalable Synchronization on Shared–Memory Multiprocessors", *ACM Transaction on Computer System*, vol. 9(1), pp. 21–65, (Feb. 1991).

Dalton, Chris, et al., Afterburner: "A network–independent card provides architectural support for high–performance protocols", *IEEE Network*, (Jul. 1993), pp. 36–43.

Saha, Avijit, et al., "Distributed Directory Tags," *Computer Architecture News*, vol. 22, No. 5, Dec. 1994, p. 27–29.

"Magnetic's Attractions," *UNIX News*, pS14, Mar. 1995, ISSN:0956–2753.

"Imscan Systems: Imscan announces joint marketing agreement with NTIOM Systems," M2 PRESSWIRE, Jan. 12, 2000.

Glass Brett, "Bad hard disk sectors can present a problem for SmartDrive," (Buyers Advisory) (Column), *InfoWorld*, vol. 14, No. 33, p. 114(1), Aug. 17, 1992.

Deering, S., et al., "IP Version 6 Scoped Address Architecture," Internet Draft, Mar. 2000; retrieved from http://ietf.org/internet–drafts/draft–ietf–ipngwg–scoping–arch–01.txt on Sep. 25, 2000.

* cited by examiner

LOCK-FREE CACHE MANAGEMENT

TECHNICAL FIELD

This invention relates generally to caches to reduce the need for multiple read/write operations. In particular, it enables a network stack to efficiently cache network addresses and corresponding type information in a multitasking computing environment.

BACKGROUND OF THE INVENTION

The phenomenal growth of network-based electronic commerce is dependent on the efficient exchange of information between various parts of a network. Use of widely accepted protocols to exchange information makes the task of application developers simpler while the developers constantly improve operating systems and services to support the protocols in use. The growth of electronic commerce is further aided by improved hardware making possible larger network bandwidths approaching the memory bandwidth available on a typical desktop workstation. Consequently, efficient handling of packets is assuming increasing importance for fully utilizing the network bandwidth.

Efficient handling of packets requires that incoming packets be classified to determine how each one is to be preferably processed. This classification reflects a type information associated with packets for identifying the flow or path to which the packet belongs. Moreover, in view of the large number of packets handled in a network and the comparable network and CPU/memory bandwidths, it is preferable to minimize the memory access operations undertaken while classifying or processing a packet. This aim becomes even more significant in view of the fact that memory access operations are much slower than processor speeds resulting in the processor idling while a memory access operation is being completed. Therefore, improved implementations for the protocols specifying packet structure should reflect the aforementioned considerations.

Packets typically conform to a handful of protocols. These protocols offer naming schemes for nodes and interfaces in the network, error-free delivery of packets, encryption and authentication of packets and the like. Some of the common protocols are described hereinafter along with new developments to expand the protocols to meet anticipated needs in the near future.

The backbone of the biggest network, the Internet is the TCP/IP suite of protocols comprising the Transport Control Protocol (TCP) and the Interface Protocol (IP) suite of modules providing various services in the network. IP provides a mechanism for addressing packets to network nodes while TCP, operating at a higher level in the network stack, ensures error free delivery of packets. In addition, the Universal Datagram Protocol (UDP), included in the TCP/IP package, enables sending and receiving data-packets without the overhead of guarantee of service required by TCP alone.

The IP protocol version 4 assigns a 32-bit address to a machine on a network. Revisions to IP version 4 to meet the needs of a larger network resulted in IP version 6 specification (hereinafter "IPv6") that provides 128-bit addresses for interfaces and sets of interfaces. Further details on IPv6 are available in the RFC 2373 document that is herein incorporated by reference in its entirety.

Network addresses enable the network stack to receive packets targeted to a specific address and forward or deliver the packet accordingly. Network addresses have additional properties such as the "type" information corresponding to a particular network address and its processing. Such type information includes details such as whether the packet is local, broadcast, multicast, remote, remote broadcast, remote multicast, subnet broadcast and the like. The precise definition of the type is implementation specific so that different network stack vendors employ different type definitions.

Storing the type information with its corresponding IP version 4 compliant 32-bit network address requires more than one machine word on a 32-bit machine. Since a network address uses at least one machine word of 32-bits for IP version 4 and higher, the type information has to be stored in another machine word. Type information requires only a few bits—typically less than four bits of a machine word—but is assigned at least one machine word due to the addressing convention used in modem computers. The two machine words encoding the address and its corresponding type should be read as one atomic unit so that intervening write operations do not result in subtle errors due to mismatches between the network address and its corresponding type.

As discussed hereinafter, the various choices for network address formats are relevant to the manner in which computing environments store, recall and use addresses along with their associated type information. Computers have a smallest unit of memory termed a machine word that can be directly addressed. The contents of a machine word are interpreted in a context dependent manner. Thus, whether a particular machine word represents an address pointing to another machine word or a network node's address or an integer depends on the particular context.

Computer operations, such as a read or write from a memory location, are performed on a machine word rather than a single bit. In a 32-bit machine the smallest unit that can be directly addressed is a 32-bits machine word. A read operation on such a 32-bit word results in all 32 bits being copied to the processor's register in one operation. In other words, the read operation is an atomic operation.

Reading two machine words requires execution of two read operations. It is possible that following the first read operation, but before the second read operation by a first thread, another thread, process or processor may overwrite the memory contents to be read during the second read. This problem becomes more acute in multiprocessor systems.

The problem is not limited to multiprocessor systems and includes multitasking systems. For instance, in multitasking computing systems, the operating system allocates limited time slices to each thread on a processor. If the time slice allocated to the first thread expires after the first read but before the second read operation then the next thread executes several instructions in its time slice. These instructions can include modifications to the location to be read in the second read operation by the first thread unless the first thread requests the operating system to prevent such access by "locking" the memory. Implementing locks does not scale well with increasing number of processors in a computing environment resulting in a significant overhead.

If the two read operations by the first thread are close together then the probability of an intervening write operation at the location to be read by the second read operation is small and the second read operation is called a "volatile" read. The volatile read operation can be made more certain by placing a "lock" on the memory location to be read by the second read operation to prevent any other thread from accessing the memory location. However, the overhead for implementing such a lock adversely affects performance.

As mentioned earlier, reading information from a memory location remote from the processor chip is significantly slower than the speed of modem processors. Thus, reading two machine words in a back to back manner may result in the processor idling for a few cycles in the intervening period between the read operations for machine words retrieved separately from the remote memory. On the other hand, not storing the type information in a cache requires deducing the type information when needed with several read operations that add to the overhead. In view of the large number of network addresses handled by the network stack small efficiencies, such as using a cache to get the type information corresponding to an address of interest, at the level of a single network address result in significant savings.

It should be noted that the term cache is used to denote a variety of stores. There are fast hardware cache memories such as the L1 cache and the L2 cache, both associated with the processor and termed CPU caches. These caches represent expensive and fast memories that help bridge the gap between the processor and the basic system memory. In contrast to the CPU caches there are caches implemented as data structures to provide frequently used information without the need to repeat lengthy computations. Type information is an example of information that can be deduced from the context and the network address and may be cached. Accordingly, further improvements in managing a cache of addresses and corresponding type information are needed to make the caching of type information more effective.

SUMMARY OF THE INVENTION

The invention described herein facilitates managing a cache for network addresses and their corresponding type information without using locks. A network stack routine either looks-up or deduces the type information corresponding to a network address of interest. The invention provides a method for recovery of the type information corresponding to an address with more reliability than using volatile reads to recover information from two or more machine words. The invention, thus, enables caching the type information for rapid lookup of data elements wherein each data element requires more bits than those available in one machine word.

A data element comprises a main part that occupies at least one machine word and a type information. The type information corresponds to the main part and is encoded in m bits. In an embodiment of the invention the main part of a data element is a network address such as an IP version 4 compliant 32-bit address in a 32-bit machine word. The total cache space for storing data elements is divided into n regions where n corresponds to the number of distinct type information encoded in m bits.

A region and an offset for identifying a machine word in the region are computed from the main part of the data element. Next, a modified data element is actually stored in the machine word so identified. The modified data element includes m-bits of the main part replaced by m-bits representing the type information.

Upon encountering a first network address, a network stack first determines whether the first network address has been cached in order to recover the type information from the cache. The network stack reads m-bits from the first network address to determine a first region. Next, the network stack computes a first offset from a hash of the first network address. If the machine word stored at the first offset in the first region corresponds to the network address, the network stack obtains the m-bits corresponding to the type information from the machine word in the cache.

Thus, only one machine word is used for storage while the knowledge of the main part of a data element allows computation of an address for a location in the cache for retrieving the associated type information from a stored modified data element. In some embodiments of the invention more than one machine word is used to store a network address and type details in a cache. However, although the type information is more reliable than that obtained using volatile read operations, it is not immune to rare failures due to more than one machine word storing a data element in the cache.

The invention includes a method of identifying an attribute of an address by identifying a region of the cache and an offset within the region from information contained in the address and deriving an attribute of the address from the identified group of one or more machine words. The method includes comparing the address to the identified group of one or more machine words to determine whether the group of one or more machine words matches the address. Furthermore, the attribute of the address can be the type information of the address and the group of machine words consists of one machine word.

The method further includes matching the address to the group of one or more machine words and reading, in response to a successful match, a specified set of bits from the group of one or more machine words to get the type information of the address. Preferably, a region in the cache has a prime number of group of one or more machine words to enable better computation of a hash of a set of bits in the address such that the hash result does not exceed a maximum offset for the region. More generally, determining the offset comprises calculating a pseudo-random number from a set of bits in the address.

And, updating the cache includes obtaining, in response to an unsuccessful match between the address and the group of one or more machine words, the type information of the address using a slow method. This step is followed by updating of the group of one or more machine words with the address and the type information of the address such that a match between the group of one or more machine words, following updating, and the address is successful.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
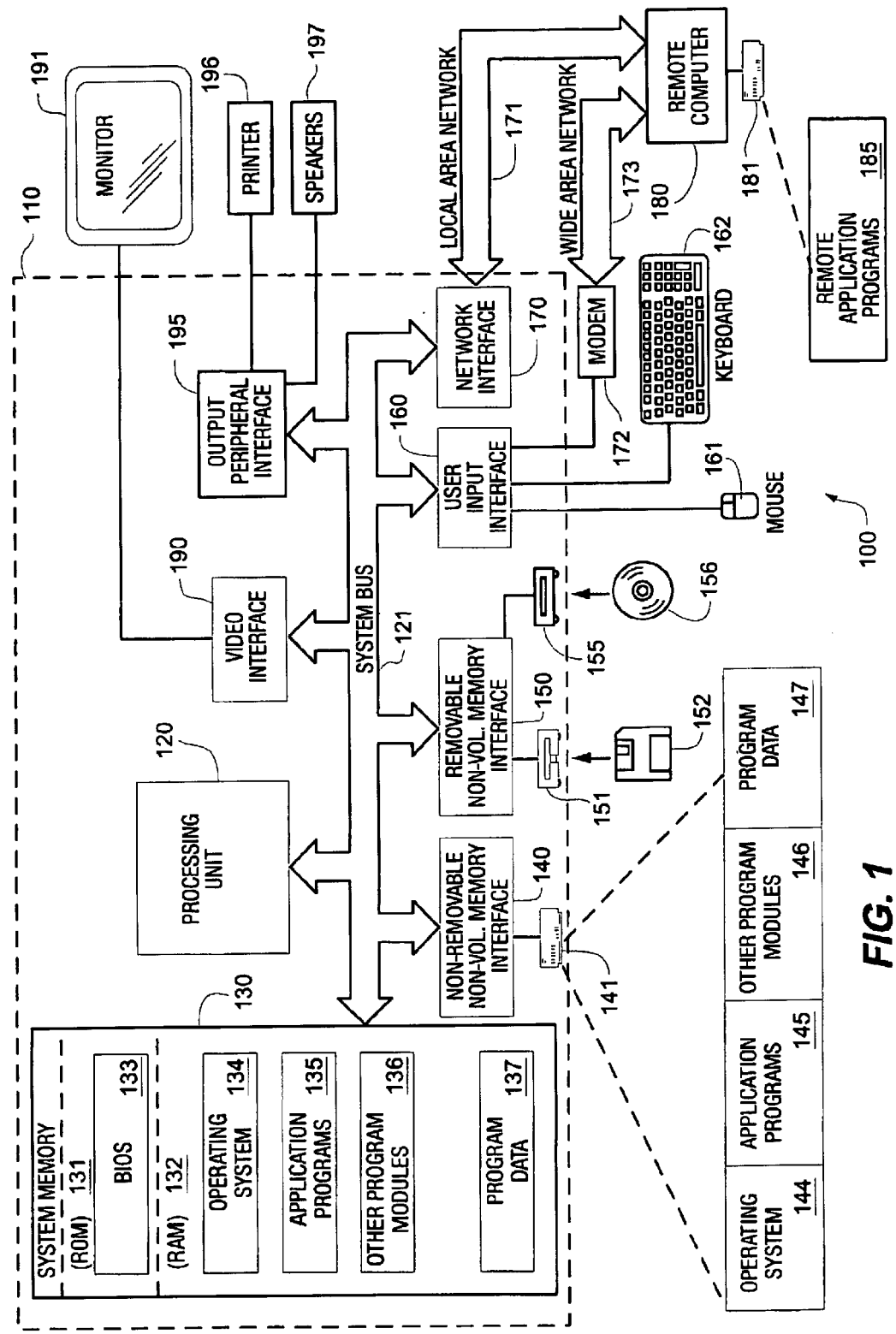
FIG. 1 is a block diagram generally illustrating an exemplary computer system on which the present invention resides.

The invention enables implementing a data structure for a cache such that the cache can be read to get a type information associated with an address. In an embodiment of the invention each address occupies one machine word although this is not a threshold requirement for practicing the invention. Reading the cache does not use locks although the type information and the address together require more bits than are available in one machine word. A data structure implemented in accordance with the invention enables reading a cache to get a type information corresponding to an address of interest such that a machine word read from the cache includes at least a part of an address for comparison with the address of interest.

Embodiments in accordance with the invention enable accessing a first machine word in the cache directly without walking along a list or table. For instance, an embodiment enables retrieval of the type information associated with a network address by using the network address to calculate the location of the first machine word in the cache. The type information is then readily obtained from the first machine word in the cache. These and additional details are further described hereinafter.

Turning to the drawings, wherein like reference numerals refer to like elements, the invention is illustrated as being implemented in a suitable computing environment. Although not required, the invention will be described in the general context of computer-executable instructions, such as program modules, being executed in a computing environment. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general-purpose or special-purpose computing system environments or configurations. Examples of well-known computing systems, environments, and configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computer 110 typically includes a variety of computer-readable media. Computer-readable media can be any available media that can be accessed by the computer 110 and include both volatile and nonvolatile media, removable and non-removable media. By way of example, and not limitation, computer-readable media may include computer storage media and communications media. Computer storage media includes both volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), EEPROM, flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can accessed by the computer 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired networks and wireless media such as acoustic, RF, and infrared media. Combinations of the any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computer 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computer 110 may also include other removable/non-removable, volatile/nonvolatile computer storage media. By way of example only, FIG. 1 illustrates a hard disk interface 140 that reads from and writes to non-removable, nonvolatile magnetic media, a magnetic disk drive 151, which may be internal or external, that reads from and writes to a removable, nonvolatile magnetic disk 152, and an optical disk drive 155 that reads from and writes to a removable, nonvolatile optical disk 156 such as a CD ROM. Other removable/non-removable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141, which may be internal or external, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer-readable instructions, data structures, program modules, and other data for the computer 110. In FIG. 1, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that they may be different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical links to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical links depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or via another appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181, which may be internal or external to the remote computer 180. It will be appreciated that the network links shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigure or otherwise alters the operation of the computer in a manner understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
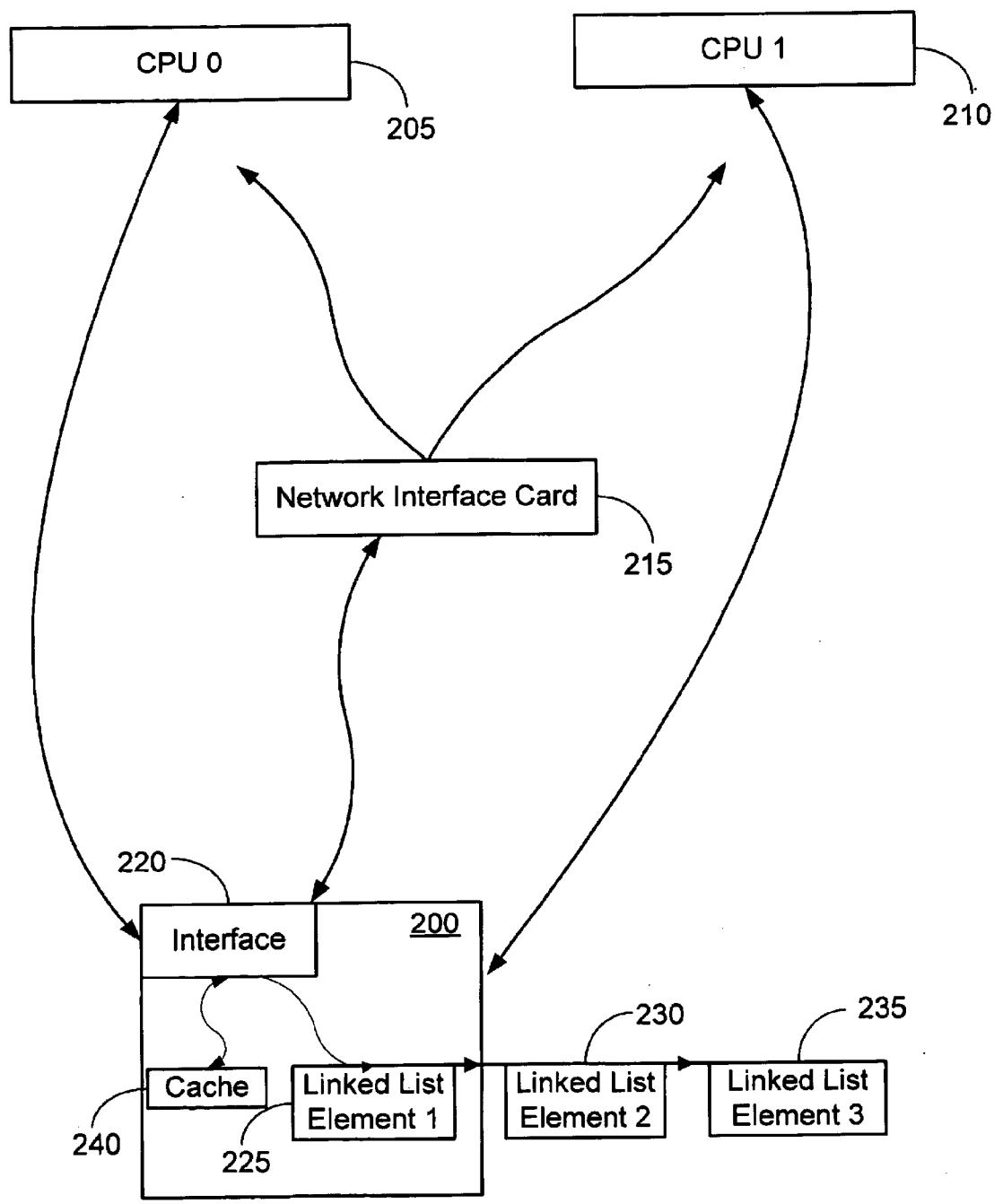
FIG. 2 is an illustration of the general computing environment with more than one processor and a common network card in which an embodiment of the invention functions.

A network stack handles data packets sent to a network or received from a network. FIG. 2 illustrates a network stack 200 in a computing environment with processors 205 and 210 having access to a common network card 215. The network card 215, similar to the network card 170 of FIG. 1, uses the network stack 200 having a network interface 220 to receive and send data packets. The network interface 220 uses a data structure represented as a linked list to store network addresses and their associated detail. These details are implementation specific and are inferred. To avoid repeatedly processing an address the details are stored in the linked list.

An exemplary linked list comprises link element 225 connected to link element 230 that is connected to link element 235. Each of the link elements 225–235 includes information about a particular address such as the type information. Determining type information from the linked list requires several read operations for walking along the linked list. To circumvent this potential bottleneck, the network stack 200 maintains a cache 240 to facilitate faster access to the type information without accessing the linked list. The cache 240 stores the network addresses encountered by the network stack along with the type information corresponding to each of the stored network addresses in a data structure for quick reference. Thus, inferring type information for an address using the linked list, tables or rules used by the computing system constitutes the "slow path" compared to accessing the cache 240.

Figure 3:
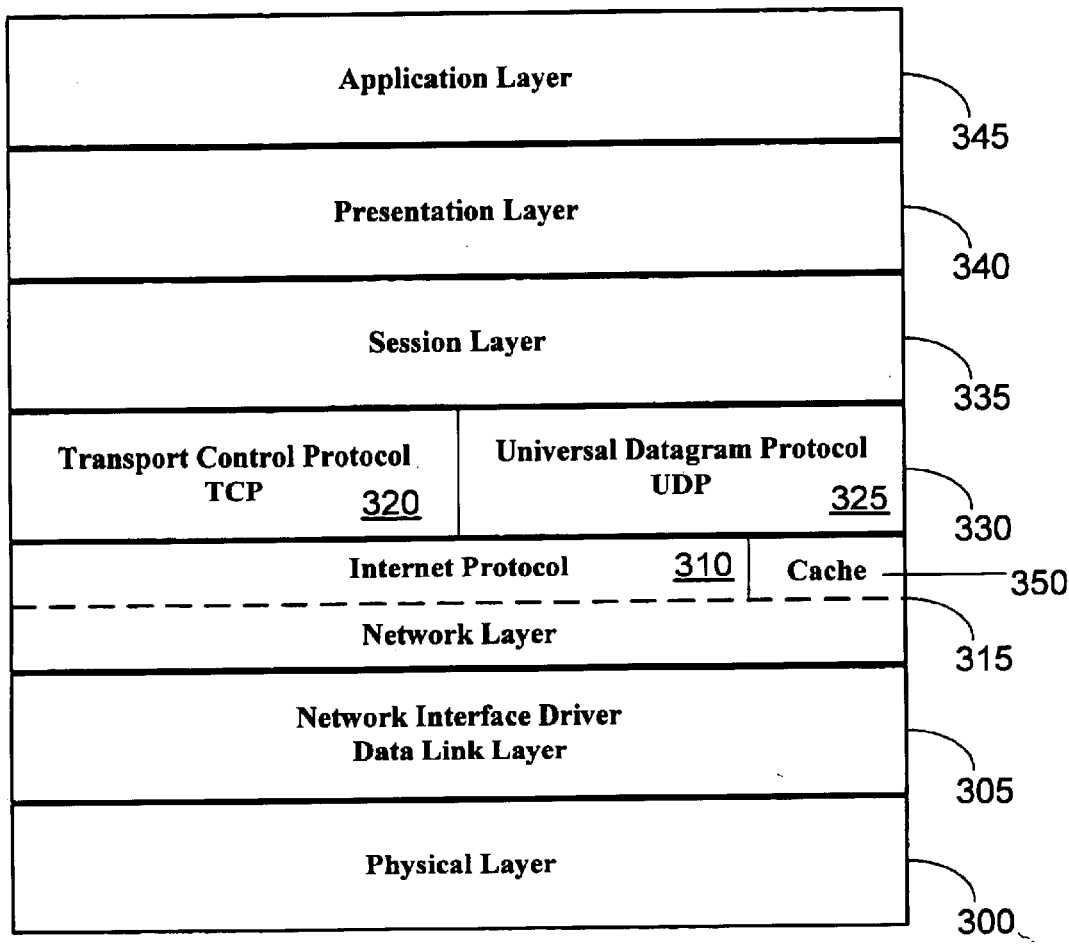
FIG. 3 illustrates the layered design based on the Open Systems Interconnection (OSI) model for networking software.

FIG. 3 illustrates a layered design in accordance with the Open Systems Interconnection (OSI) model. This model serves as a familiar design reference for communications between different systems. At the bottom is the physical layer 300, above which lies the data link layer 305. The Internet Protocol (IP) layer 310 corresponds to the network layer 315 of the OSI model, which is also the third layer in the OSI model. The IP layer 310 provides uniform address naming and routing functions. The routing functions allow forwarding of IP packets, called IP datagrams to the next destination identified by the IP address. Thus, a data packet to be sent over the network moves down the stack while a data packet received from the network, and addressed to the set of interfaces served by the stack, moves up the stack. The IP address is typically a 32-bit number, although, as noted previously, IPv6 enables 128-bit addresses. It should be noted that there are alternative specifications other than IP that maybe implemented in the network layer. Accordingly, the description of IP based network stacks is not intended to be limiting on the scope of the invention as would be readily apparent to those of ordinary skill in the art.

The TCP 320 and UDP 325 functionalities provided above the IP layer correspond to the fourth OSI transport layer 330. TCP 320 provides for a specific encapsulation strategy for sending data to enable error correction and acknowledgment of received datagrams. TCP 320 and UDP 325 utilize IP compliant addresses for receiving and sending packets. Above the transport layer 330 lie the session layer 335, the presentation layer 340 and the application layer 345. Notably, the IP layer 310 includes access to a cache 350 for rapid look up of addresses and their associated type information for further handling of IP packets.

Figure 4:
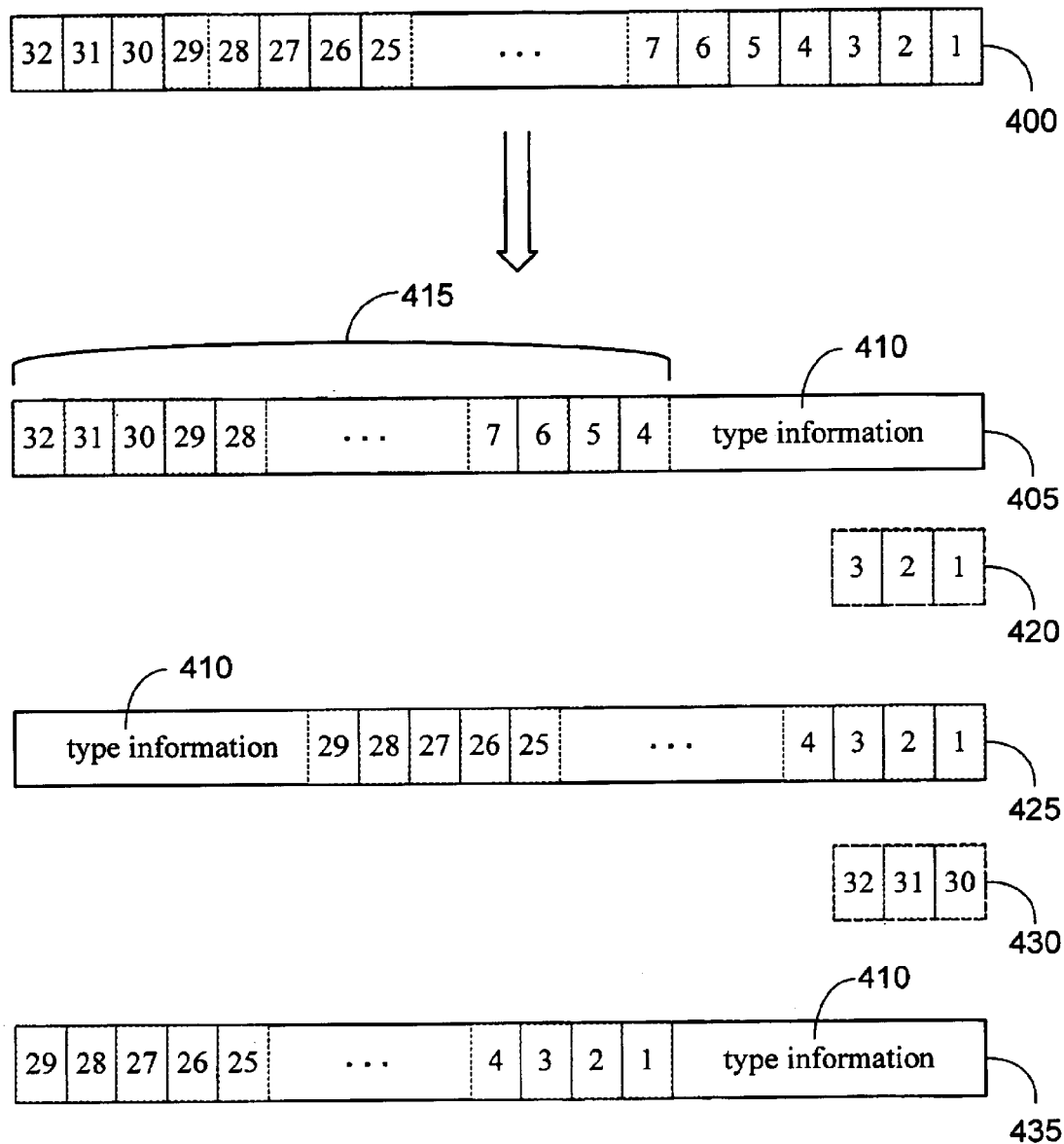
FIG. 4 is illustrates three of the many embodiments for machine words in a cache containing type and address information in accordance with the invention.

FIG. 4 illustrates a possible embodiment for a cache data structure providing access to network addresses and the corresponding type information. This data structure is advantageously implemented in memory similar to RAM 132 of FIG. 1. It should be noted that a cache in accordance with the invention is also implemented using the high-speed memory provided in association with a microprocessor. This memory is also termed cache memory and commonly referred to as the L1 or the L2 cache. Presently available processor chips do not have a lot of memory in their L1 and L2 caches, although future generations of processor chips may provide sufficient memory.

Determining whether a particular address is present in the cache implemented as a table typically requires scanning entries in the table. Each of these read operations requires at least one read operation. Reading two machine words to obtain information, e.g., an address stored in two machine words, is susceptible to the possibility that one of the machine words may change in the time interval between the two read operations. However, to protect against the possibility of such a change, a thread locks the table while accessing it. Failure to lock the table can result in errors that are not easily reproduced, and, consequently, are difficult to correct.

A read operation following another read operation is a volatile read operation because the probability of the second read operation being compromised by an intervening write operation is small. While a volatile read is adequate for many applications it is not acceptable in all circumstances. For instance, incorrect type information associated with a network address due to failure of a volatile read can result in targeting data packets to unintended targets. On the other hand, preventing errors due to volatile read operations requires locking the relevant memory area and expenditure of additional overhead while rendering the cache inaccessible for the duration of the lock to other threads.

In an exemplary embodiment of the invention a row in a table can be addressed directly using a mapping strategy rather than walking along the table. A directly identified row entry is compared to a part of a network address. If the two have identical bits as is required for a match then the next entry in the row is compared to another part of the network address. If another match is found then the possibility of an intervening write operation between the two read operations from the row is reduced to below that of a volatile read operation. For instance, if a first match requires that thirty least significant bits of a 64-bit address are required to be identical to the thirty most significant bits in the first row entry then the remaining two bits in the first row entry are available for encoding type information. Additional, confidence in the type designation is acquired by requiring that all thirty-two bits of the second row entry be identical to the thirty-two most significant bits of the address for a second match. The remaining two network address bits not used in the first or second match are used to locate the row resulting in the verification of all 64-bits of the network address.

It is possible that an intervening write operation may have taken place between the read operations on the two row entries. However, such a write operation must have replaced the second row entry with a matching entry because any other entry would result in the second match failing. Then, the intervening write operation results in harmless error so long as the first row element is read prior to the second row element. On the other hand, if the intervening write operation replaces a non-matching second entry with a matching operation, then a false match results. However, the likelihood of such a false positive is much smaller than a volatile read due to the detection of most intervening write operations.

This approach can be generalized for applicability to 128-bit addresses stored on 64-bit machines, and even 32-bit machines as discussed hereinafter. The extension of this approach to rows having more than two elements results in type information with less than absolute reliability because more than two read operations are used to read all the elements in a row without using locks. However, storing the type information in a machine word by itself is far less reliable because it offers no protection against intervening write operations. Thus, storing a 128-bit address on a 32-bit machine requires at least four machine words in a row. The first read and match operation identifies a type information while the subsequent read and match operations verify that the type information corresponds to the entire network address.

FIG. 4 illustrates some possible ways for including type information in a network address containing machine word by replacing a few bits in the machine word. A machine word 400 containing a network address is transformed into machine word 405 with type information 410 in the most significant three bits of the machine word 405 and the network address information in the twenty-nine bits 415. In addition, the dashed box 420 shows the three most significant bits from the network address that are replaced by the type information 410 in the machine word 405. In an embodiment of the invention, the three bits 420 are used to calculate a region index for determining a cache segment or region in a cache.

In an alternative exemplary embodiment, the three least significant bits represent the type information in a machine word 425. In the machine word 425, type information 410 occupies the last three bits. The network address information encoded by the three least significant bits from the network address is shown alongside in the three bits 430. Similarly, in another exemplary embodiment the type information is placed in the most significant three bits while removing the least significant three bits from the network address as depicted in a machine word 435. It should be noted that storing type information in non-contiguous bits in a machine word is also within the intended scope of the invention.

Figure 5:
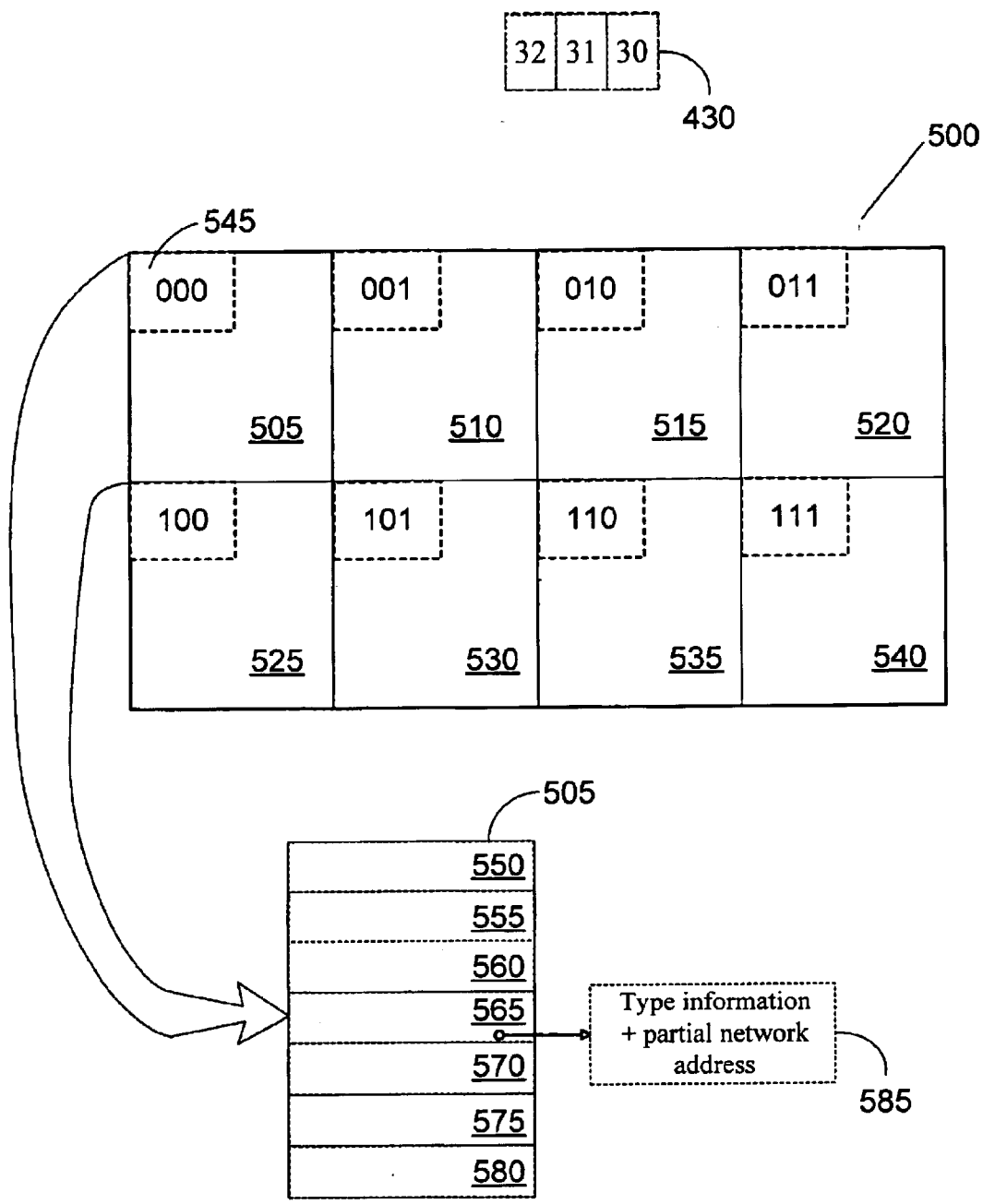
FIG. 5 is schematic representation of a cache with a plurality of cache-regions in accordance with an embodiment of the invention.

FIG. 5 shows a cache 500 having a plurality of regions 505–540. The regions 505–540 correspond to the three bits removed from the network address. Dashed box 430 of FIG. 4 helps calculate a region index to identify a region in the cache 500. As an example region index 545 having the value "000" in binary notation labels region 505. FIG. 5 also shows the remaining regions 510 through 540 with a possible allocation of their respective region indices. Moreover, FIG. 5 should not be interpreted to exclude alternative mappings from a network address to the region index from the intended scope of the invention. In addition, FIG. 5 shows the structure of a possible region in a cache. Specifically, region 505 comprises machine words 550 through 580 for a total of seven machine words. Of course, in general, the number of machine words in a region need not be seven, or even a prime number. Type information and at least a part of the network address are stored in a machine word in a region. For instance, the machine word 565 has a type information associated with a partial network address as is shown by the arrow leading to the box 585.

Figure 6:
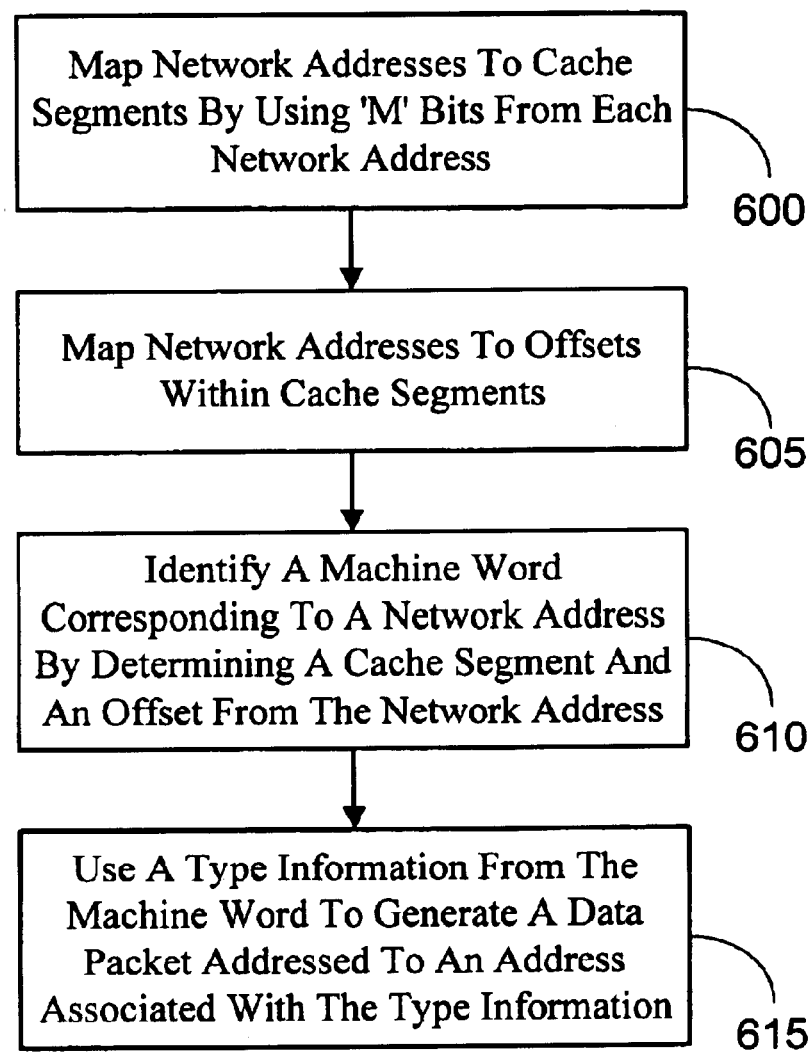
FIG. 6 is a flow diagram summarizing steps for identifying a machine word in a cache constructed in accordance with an embodiment of the invention.

FIG. 6 is a flowchart summarizing steps for implementing a cache in accordance with one of the embodiments of the invention. During step 600 a region of memory is organized into a data structure for implementing a cache. The cache data structure has a plurality of regions, each region including one or more groups of machine words. Each group of machine words has at least one machine word. Each region or cache segment is associated with 'M' bits from a network address. The particular 'M' bits used to identify a cache segment are not necessarily contiguous. They are preferably fixed in each implementation. For instance, in a particular implementation the first three bits from a network address are used to locate a cache segment in a cache.

Figure 7:
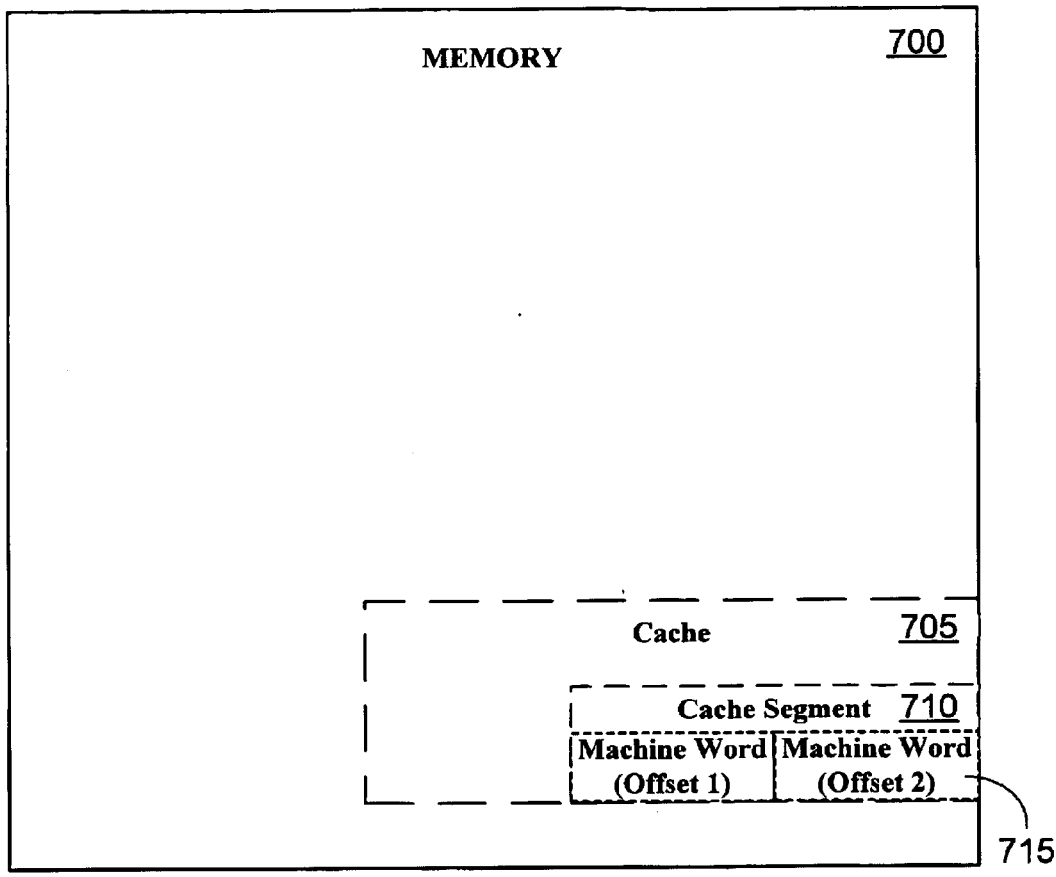
FIG. 7 is a block diagram schematically illustrating the organization of a cache in memory in accordance with an embodiment of the invention.
Figure 8:
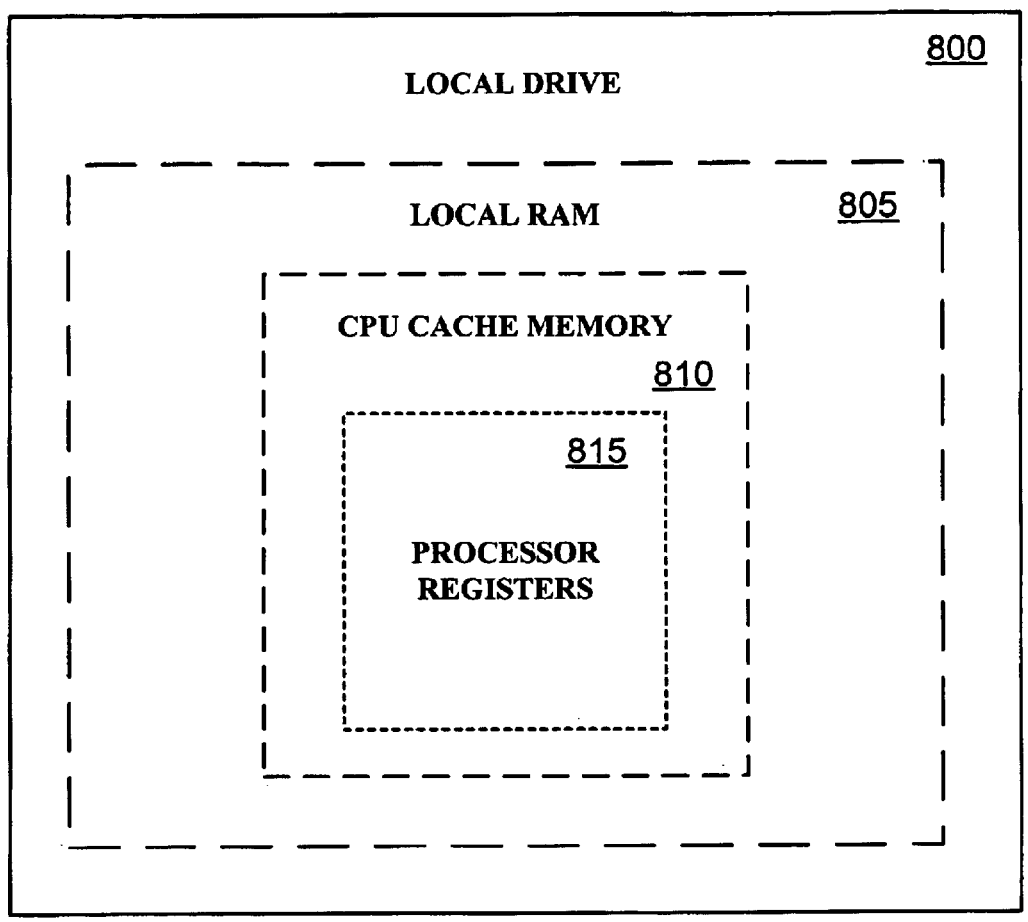
FIG. 8 is a block diagram schematically illustrating the different kinds of memory in relation to a processor for implementing a cache in accordance with an embodiment of the invention.

An example of such a cache is provided in FIG. 7. In FIG. 7 a memory 700 has a sub-region used as a cache 705. Within the cache 705 there is at least one region 710 that has at least two machine words 715. FIG. 8 further illustrates the various kinds of memories in a typical computing system. A local hard drive 800 provides relatively slow access to a large amount of data. Random Access Memory (RAM) 805 on fast chips provides faster memory access than the drive 800, but slower than central processing unit ("CPU") associated CPU cache memory 810 available on or very close to the chip housing the processor. CPU cache memory 810 is a memory bank bridging the main memory and the CPU. It is faster than main memory transfers data and instructions in blocks using a look-ahead algorithm. CPU cache memory includes a level one (L1) cache that is bridged to the main memory using a level two (L2) cache) and possibly additional levels of caching. However, the L1 and L2 caches are distinct from the cache data structure taught by the invention although it is implementable in L1 or L2 caches along with other physical or virtual memories.

Even faster memory is provided in the processor registers 815. The computing speed of modem processors is almost a magnitude of order faster than the access time for RAM 805. Consequently, a tradeoff is possible between computational time and access time for retrieving data from non-CPU cache memory. Faster but scarce memory can then store frequently used data using computational strategies to reduce the physical memory requirements by calculating addresses. Computational strategies also reduce the number of memory access operations for retrieving or storing a unit of data.

In accordance with the invention, a plurality of cache segments, also termed regions, form the cache with each cache segment having an identifier. The identifier for a cache segment corresponds to an offset relative to the address of the cache in memory. A cache structure in accordance with the invention is implemented in real or virtual memory. In the case of virtual memory the operating system maps virtual memory addresses into actual physical memory locations.

During step 600, 'M' bits from the network address are mapped into the identifiers for the cache segments in an 'onto' mapping. Several possible network addresses map to the same cache segment since there are many more network addresses than there are cache segments. FIG. 5 provides an example of such a mapping. A cache segment 505 has a cache identifier '000' (in binary notation). Any network address having these 3-bits as its three most significant bits is mapped into the cache segment 505. In a 32-bit network addressing scheme there are $2^{29}$ possible network addresses with the first three bits as '000.'

During step 605 the network address is mapped into an offset within a cache segment, which has several machine words. Moreover, given a network address, a particular machine word is determined as a corresponding location in the cache. Determining the offset from the network address itself eliminates the need to walk a table, and consequently perform several read operations. Each step in walking down a table requires a read operation followed by testing to determine whether the read operation retrieved the correct element of the table.

Preferably, the mapping of network addresses to offsets in a cache segment should allow even usage of all acceptable offsets. Network addresses actually stored in a cache reflect user preferences and, consequently, vary from one user to another user. Consequently, several embodiments of the invention employ a randomized mapping of network addresses into the possible offsets. An example of such a mapping is generating a pseudo-random number in the range of the number of addresses in a cache segment. An embodiment of the invention uses a hash function Offset=(1103515245*Network_Address+12345) % RegionSize where RegionSize is the number of machine words in the cache segment and the operation "%" represents a modulo operation. Many pseudo-random generators employ modulo operations for generating pseudo-random numbers including those similar to this hash function. Each cache segment has a RegionSize of 31 addresses such that each address corresponds to a machine word or a group of machine words. Of course, any other number can be used as the RegionSize although prime numbers, such as 31, evenly use the addresses in a region for randomly chosen network addresses.

Given a network address, during step 610, a machine word in a cache segment is identified by determining the cache segment and an offset within the cache segment corresponding to the network address. It should be noted that the offset locates one machine word, as described herein, or a block of machine words as described hereinafter. For instance, the two contiguous machine words in a row of a table are referenced by an offset to locate the first machine word in the row. The second machine word is shifted by one memory location relative to the first machine word and need not be addressed independently.

During step 615 a type information associated with the network address is read and used to generate a data packet addressed to one or more addresses. If the type information indicates that outgoing data packets should be sent to a plurality of addresses, e.g., a broadcast type then several data packets are generated with the appropriate addresses using a routing table. Other examples of type information usage include determining whether a response should be sent to an Internet control message protocol ("ICMP") message or whether a local local address resolution protocol ("ARP") table should be consulted while processing ARP packets.

Figure 9:
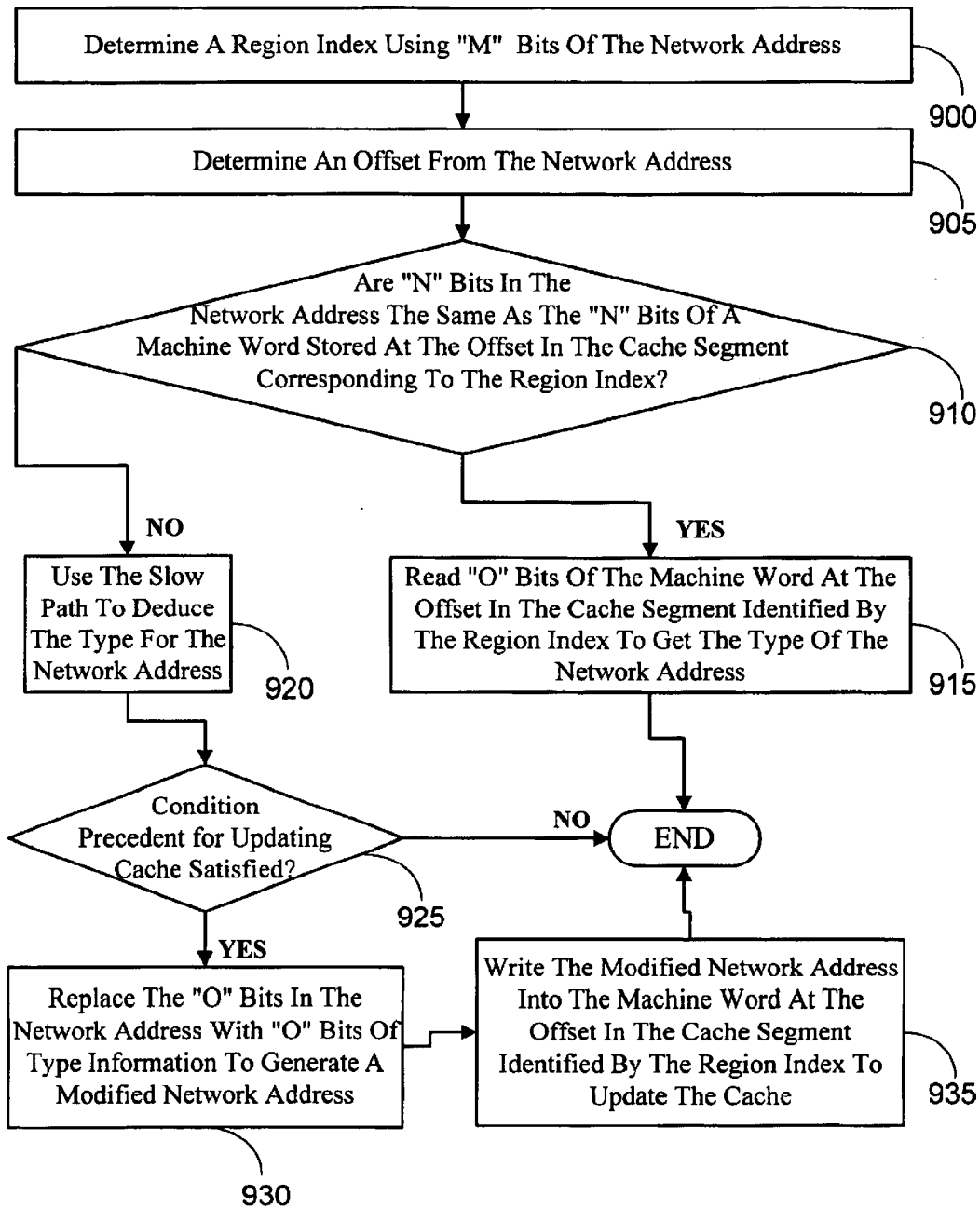
FIG. 9 is flow diagram summarizing steps for obtaining the type information corresponding to a network address and, alternatively, if such information is not cached, to update the cache in accordance with an embodiment of the invention.

FIG. 9, which should not be construed to limit the variations on the steps, summarizes another sequence of steps for determining whether a particular network address has its corresponding type information in a cache or requires updating the cache to enter such information. During step 900 "M" contiguous bits from the network address determine a Region Index. During step 905 a randomizing function generates an offset corresponding to the network address. Notably, the randomizing function is not limited to the hashing function nor are the "M" bits required to be contiguous.

Following step 905 control passes to decision block 910. During step 910 "N" bits from the network address are compared to "N" bits in a machine word stored at the offset of step 905 in the region identified by the Region Index of step 900. If the compared bits match control passes to step 915 wherein "O" bits of the machine word identified in step 910 provide the type information corresponding to the network address. It is intended that the type information could be represented by as few as one bit or even more than three bits. Binary representation of type information of a network address requires significantly fewer bits than the number of bits used to represent the network address itself. For instance, representing addresses as broadcast addresses or as specific for a particular target node requires only two type categories, i.e., remote or local. Following step 915 the method terminates. On the other hand, if the bits compared during step 910 do not match, then control passes to step 920.

It should be noted that in another embodiment in accordance with the invention a machine word having the type information for a network address also has at least some of although not all of the remaining bits of the machine word matching the bits in the network address. Consequently, in an atomic read operation from the word there is an assurance that the type information read corresponds to the intended network address with a high probability even if all of the bits in the network address are not compared with the bits read from the machine word. If sufficient number of bits corresponding to the network address is included there is a certainty that the type information corresponds to the network address in question.

During step 920 the type information is determined using the slow path. Following step 920, during step 925, if a condition precedent for updating the cache information is satisfied control passes to step 930. Otherwise the procedure terminates. During step 930 "0" bits of the network address are replaced by type information corresponding to the network address to generate a modified network address. Next, during step 935, the modified network address replaces the information in the machine word identified by the machine word stored at the offset of step 905 in the region identified by the Region Index of step 900. Following step 935 the procedure terminates.

Figure 10:
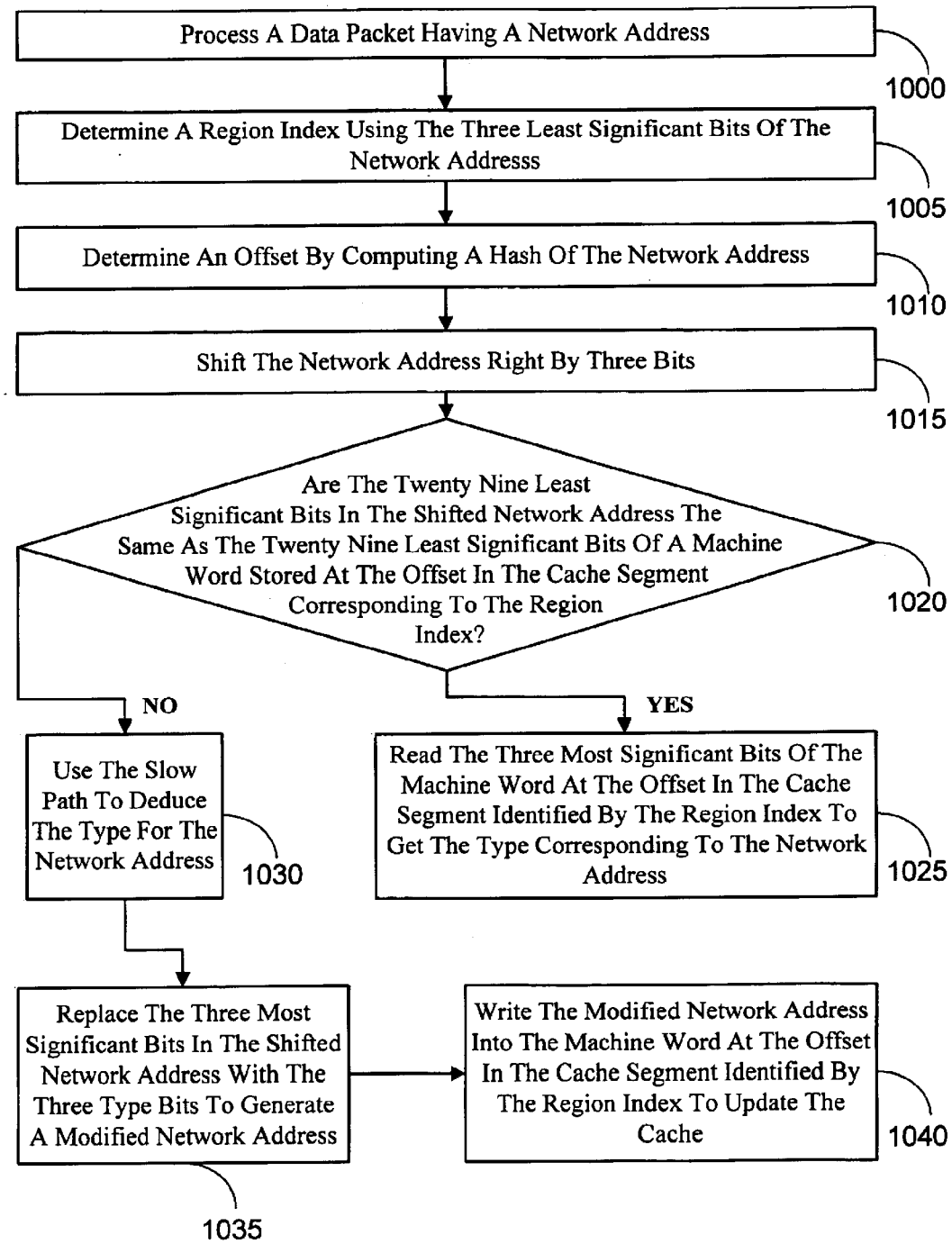
FIG. 10 is flow diagram summarizing steps for obtaining the type information corresponding to a network address and, alternatively, if such information is not cached, to update the cache in accordance with an embodiment of the invention suited for computing environments using 32-bit machine words.

FIG. 10, which should not be construed to limit the variations on the steps, illustrates a set of steps for representing and caching type information within a 32-bit machine word by replacing the last three relatively variant bits with the type information. In an embodiment of the invention, the type information for IP version 4 compliant network addresses is stored as a TypeCode that, in binary format, uses 3-bits to represent the address types as 000=Local
001=Broadcast
010=Multicast
011=Remote
100=Remote broadcast
101=Remote multicast
110=Subnet broadcast During step 1000 a computing environment receives a data packet with an IP compliant network address. The three least significant bits of the network address determine a RegionIndex that corresponds to a region in a cache during step 1005, which is more specific than step 900 of FIG. 9. During step 1010, a hash of the network address generates an offset within the region. A module in the network stack right shifts the network address occupying a machine word of 32-bits by three bits during step 1015 so that the least significant twenty nine bits of the shifted network address correspond to the twenty-nine most significant bits of the original network address.

During step 1020 if the twenty nine least significant bits of the machine word, identified using the offset from step 1010 in the region of step 1005, are the same as the twenty-nine least significant bits of the shifted network address of step 1015, control passes to step 1025. During step 1025 the three most significant bits from the machine word in the cache determine the type corresponding to the network address. Otherwise, during step 1020, control passes to step 1030.

During step 1030 the slow path enables deduction of the type corresponding to the network address. The slow path includes examining the network address itself or using the linked list depicted in FIG. 2 to obtain the type information. Updating the cache and the linked list during step 1035 speeds up subsequent type determinations for the network address. In particular step 1035 includes writing type information into the three most significant bits of the shifted network address of step 1015 to generate a modified network address. During step 1040 the modified network address replaces the information in the machine word identified using the offset from step 1010 in the region of step 1005.

In another embodiment of the invention, the cache is organized so that an offset references a group of machine words within a region in the cache. If an address, itself, requires more bits than those available in a machine word then the block of machine words is chosen to provide sufficient number of machine words. For instance, an IP address compliant with IPv6 comprises 128 bits. However, present day computers use 32-bit machine words and the next generation computers will use 64-bit machine words. Thus, even with 64-bit word machines two machine words are needed to store an IPv6 compliant address.

Figure 11:
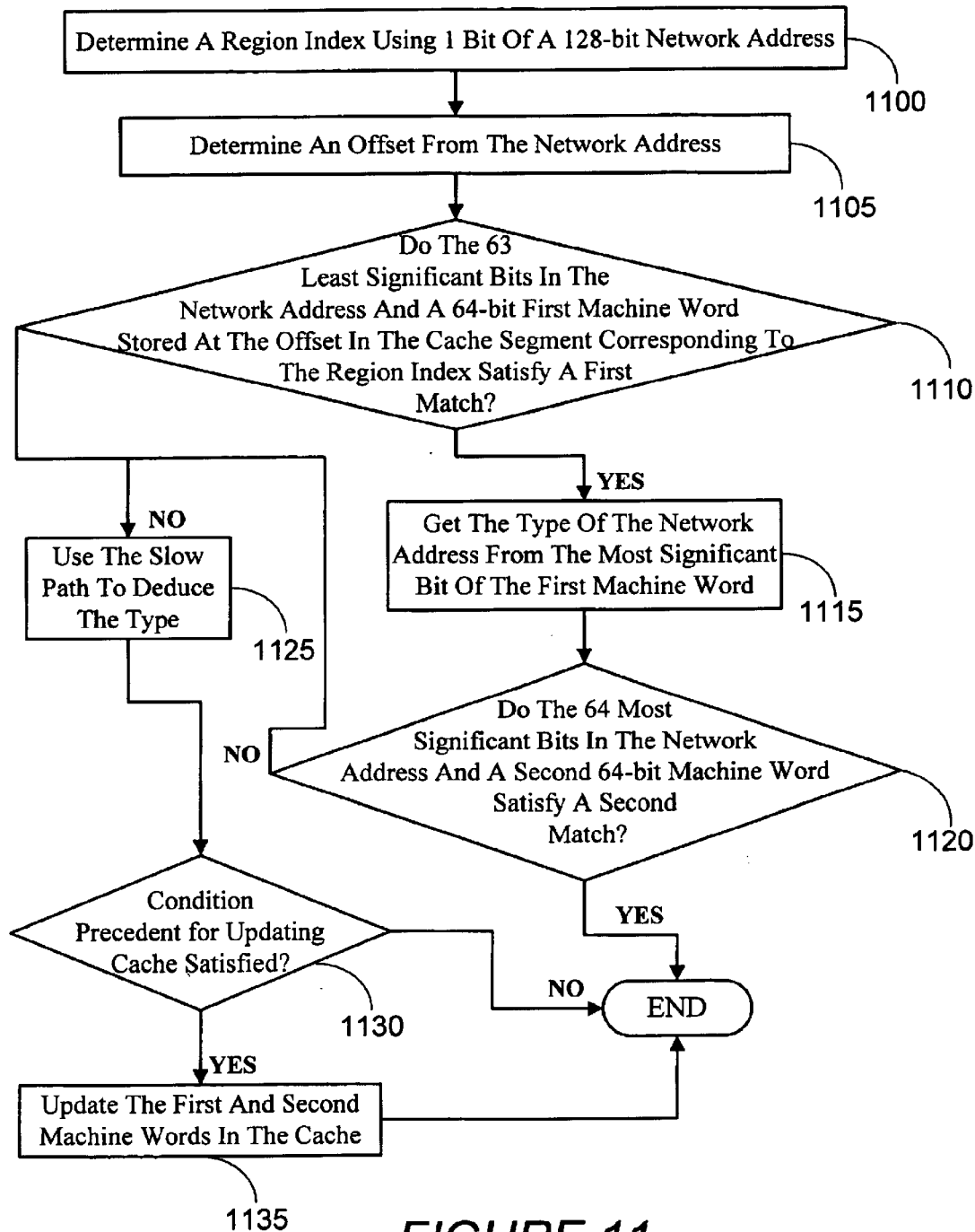
FIG. 11 is a flow diagram summarizing steps for obtaining the type information corresponding to a 128-bit address stored in a cache on a 64-bit machine.

An IPv6 compliant address includes type information to identify unicast and multicast addresses. An implementation of IPv6 should not forward packets that are intended to be directed to interfaces within a site. Thus, a local and non-local type can be defined, although this is not the only possible type definition. FIG. 11 summarizes exemplary steps in managing IPv6 compliant addresses with two types that can be represented by one bit in a cache implemented in a 64-bit machine word computing environment. It should be noted that implementing a cache for 128 bit network addresses and two types with 128-bit machine words is a simple variation on the scheme illustrated in the FIG. 10. Conveniently, and with no loss of generality, in this embodiment the sixty-fifth least significant bit of a 128-bit address determines the region index during step 1100. Next, during step 1205, as in FIGS. 9 and 10, an offset is determined from the 128-bit address. This offset corresponds to a hash of the 128-bit address although not all of the 128 bits have to be used in the hash. Note that in this embodiment the offset identifies two contiguous machine words in a region to allow a 128-bit address to be stored.

IPv6 enables assigning addresses to interfaces such that the address has a prefix identifying a link or even a site and a suffix having a specific interface ID as illustrated below. If the prefix is fixed then only the last 64-bits need be cached. On a 64-bit machine this is easily performed as a variation on the embodiments illustrated in FIG. 9 or 10.

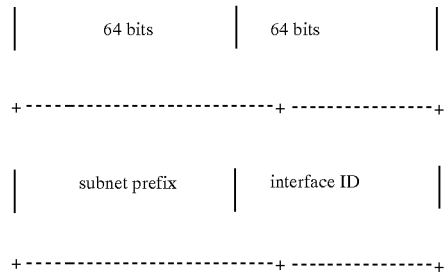

However, when the address cannot be reduced to a machine word then a cache entry has two or more machine words as depicted in the embodiment in FIG. 11.

During step 1110 the sixty-three least significant bits of the 128-bit address are compared to the sixty-three least significant bits of a first machine word at the offset in the region corresponding to the region index in the cache. If the bits are identical then, during step 1115, the type of the 128-bit address is obtained from the most significant bit of the first machine word. However, at this stage only 64 of the 128 bits of the address are verified, hence the type is not known to be entirely reliable.

Further reliability of the type information deduced in step 1115 is confirmed during step 1120. During step 1120 if the sixty-four most significant bits of the 128-bit address match the sixty-four bits in the second machine word from the two contiguous machine words corresponding to the offset determined during step 1105, the method ends.

However, if the match during steps 1110 or 1120 fails, the control passes to step 1125. During step 1125 the network stack deduces the type using the slow method instead of the cache. During step 1130 if a condition precedent is satisfied then the control passes to step 1135. Otherwise the method ends. An example of a condition precedent is to add only frequently used addresses to the cache. During step 1135 the first and second machine words are updated with the type and address information. In particular, in the exemplary embodiment of FIG. 11, the most significant bit in the first machine word stores the type information while the sixty-three least significant bits of the first machine word store the sixty-three least significant bits of the address. Furthermore, the second machine word stores the sixty-four most significant bits of the address.

The exemplary embodiment of FIG. 11 is not intended to limit the invention to one bit type information or a cache having two regions and the like. Instead, FIG. 11 is an illustration of the application of the invention to 128-bit and even longer addresses. Suitable computing environments for the invention are not limited to 32-bit or 64-bit machine words as would be apparent to one of ordinary skill in the art. Furthermore, the generation of an offset need not use all of the bits in an address. Instead, internal consistency in an implementation is all that is required to ensure a fast and effective cache implementation in accordance with the invention.

In view of the many possible embodiments to which the principles of the invention may be applied, it should be recognized that the embodiment described herein with respect to the drawing figures is meant to be illustrative only and should not be taken as limiting the scope of invention. For example, those of ordinary skill in the art will recognize that elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

All of the references cited herein, including patents, patent applications, and publications, are hereby incorporated in their entireties by reference.

I claim:

1. A method of identifying an attribute of a network address, where the address comprises at least one machine word, the method comprising the steps of:

identifying a region of a cache and an offset within the region from information contained in the network address, where the offset identifies a group of one or more machine words in the region; and deriving the attribute of the network address from the identified group of one or more machine words;

wherein at least one machine word in the group of one or more machine words in the region contains bits describing the network address and further contains bits describing the attribute.

2. The method of claim 1 wherein the step of deriving includes the step of comparing the network address to the identified group of one or more machine words to determine whether the group of one or more machine words matches the network address.

3. The method of claim 1 wherein the attribute of the network address is type information of the network address.

4. The method of claim 3 wherein the group of machine words consists of one machine word.

5. The method of claim 3 further having the steps of:
matching the network address to the group of one or more machine words; and
reading, in response to a successful match, a specified set of bits from the group of one or more machine words to get the type information of the network address.

6. The method of claim 5 wherein the region has a prime number of group of one or more machine words.

7. The method of claim 3 wherein the network address has one-hundred-twenty-eight bits.

8. The method of claim 3 wherein a machine word in the group of machine words as sixty-four bits.

9. The method of claim 3 wherein a machine word in the group of machine words thirty-two bits.

10. The method of claim 3 wherein the step of determining the offset further comprises calculating a random number from a set of bits in the network address.

11. The method of claim 10 wherein the random number is calculated by computing a hash of a set of bits in the network address such that the hash result does not exceed a maximum offset for the region.

12. The method of claim 3 further comprising the steps for updating the cache by:
obtaining, in response to an unsuccessful match between the network address and the group of one or ore machine words, the type information of the network address using a slow method; and
updating of the group of one or more machine words with the network address and the type information of the address such that a match between the group of one or more machine words, following updating, and the network address is successful.

13. The method of claim 3 wherein a computing environment includes a plurality of processors having access to the cache.

14. The method of claim 3 wherein the network address corresponds to Internet Protocol (IP) compliant address having thirty-two (32) bits in a computing environment using thirty-two (32) bit machine words.

15. The method of claim 3 wherein the network address corresponds to Internet Protocol (IP) compliant address having one hundred and twenty eight (128) bits in a computing environment using sixty-four (64) bit machine words.

16. The method of claim 3 wherein the network address corresponds to Internet Protocol (IP) compliant address having one hundred and twenty eight (128) bits in a computing environment using one hundred and twenty eight (128) bit machine words.

17. The method of claim 3 wherein the network address corresponds to Internet Protocol (IP) compliant address having one hundred and twenty eight (128) bits in a computing environment using thirty-two (32) bit machine words.

18. The method of claim 5 further having the step of sending a data packet to a second computing environment, the second computing environment associated with the network address, in accordance with the type information of the network address.

19. A first data packet generated in accordance with the method of claim 5 wherein the data packet includes information sufficient to send it to at least one address associated with the type information of the network address.

20. A computer-readable medium having computer executable instructions for performing the steps of a method of identifying an attribute of a network address, where the network address comprises at least one machine word, the method comprising the steps of:
identifying a region of a cache and an offset within the region from information contained in the network address, where the offset identifies a group of one or more machine words in the region; and
deriving an attribute of the network address from the identified group of one or more machine words;
wherein at least one machine word in the group of one or more machine words in the region contains bits describing the network address and further contains bits describing the attribute.

21. The computer readable medium of claim 20 wherein computer executable instructions for carrying out the step of deriving include the step of comparing the address to the identified group of one or more machine words to determine whether the group of one or more machine words matches the network address.

22. The computer readable medium of claim 20 wherein the attribute of the network address is type information of the network address.

23. The computer readable medium of claim 22 further having compute executable instructions for carrying out the steps of:
matching the network address to the group of one or more machine words; and
reading, in response to a successful match, a specified set of bits from the group of one or more machine words to get the type information of the network address.

24. The computer readable medium of claim 23 further having compute executable instructions for carrying out the steps of:
obtaining, in response to an unsuccessful match between the address and the group of one or more machine words, the type information of the network address using a slow method; and
updating of the group of one or more machine words with the network address and the type information of the network address such that a match between the group of one or more machine words, following updating, and the network address is successful.

25. The computer readable medium of claim 22 wherein the network address has one-hundred-and-twenty-eight (128) bits.

26. The computer readable medium of claim 22 wherein a machine word has sixty-four (64) bits.

27. The computer readable medium of claim 22 wherein a machine word has thirty two (32) bits.

28. The computer readable medium of claim 22 having instructions for executing the step of determining the offset by calculating a random number from a subset of bits in the network address.

29. The computer readable medium of claim 28 wherein the instructions for executing the step of determining the offset include computing a hash of the subset of bits in the network address such that the hash result does not exceed a maximum offset for the region.

30. A data structure for implementing a cache to reduce the number of memory access operations by a processor in a computing system, the cache data structure comprising:
- a predetermined region of memory; and
- a plurality of regions in the predetermined region of the memory, each of the regions from the plurality of regions mapped to a first subset of bits in a network address; and
- a plurality of groups of machine words in each of the plurality of regions, each group in the plurality of groups of machine words having at least one machine word and wherein, furthermore, each group from the plurality of groups of machine words being associated with an offset corresponding to a second subset of bits in the network address;

wherein at least one machine word from each group from the plurality of groups of machine words is for storing bits from both the network address and from an attribute associated with the network address.

31. The data structure of claim 30 wherein if a group in the plurality of groups of machine words has more than one machine word then all of the machine words in the group in the plurality of groups of machine words are contiguous.

32. The data structure of claim 30 wherein the offset identifies the first machine word in the each group from the plurality of the groups of machine words.

33. The data structure of claim 32 wherein the each group from the plurality of the groups of machine words has only one machine word.

34. The data structure of claim 30 wherein there is a prime number of groups in the plurality of groups of machine words.

* * * * *